April 9, 1968  F. E. KRUSE  3,377,602
CORE SUPPORTING STRUCTURE HAVING ENCAPSULATED COIL THEREON
Filed May 31, 1966
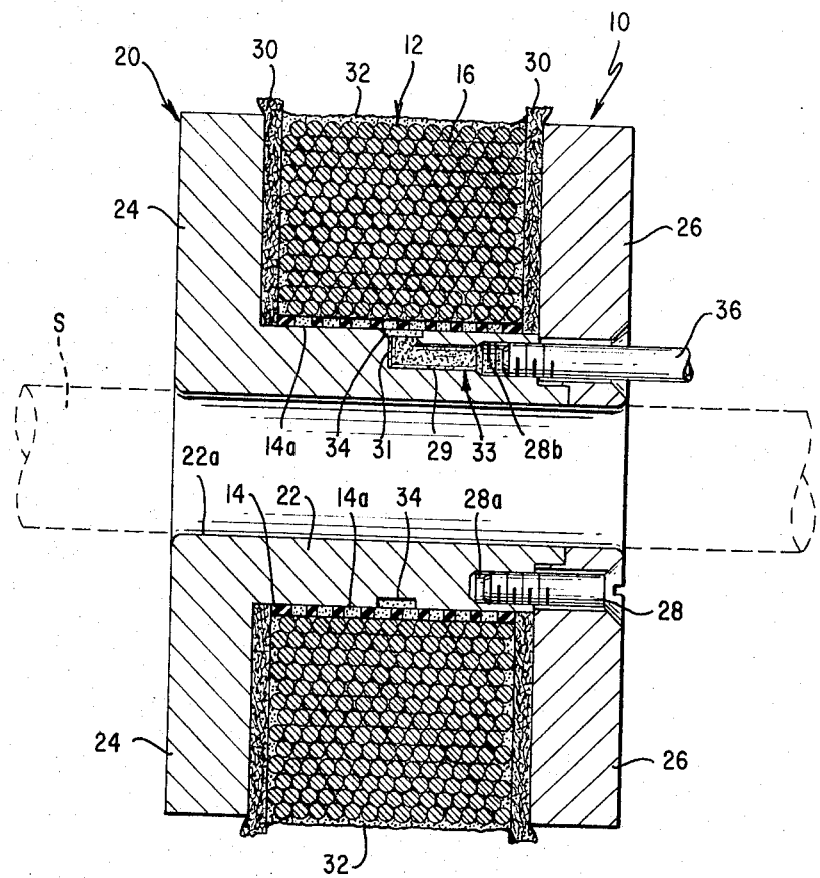
INVENTOR.
FREDERICK E. KRUSE
BY
ATTORNEY

United States Patent Office 3,377,602
Patented Apr. 9, 1968

3,377,602
CORE SUPPORTING STRUCTURE HAVING
ENCAPSULATED COIL THEREON
Frederick E. Kruse, Toledo, Ohio, assignor to
Eltra Corporation, Toledo, Ohio
Filed May 31, 1966, Ser. No. 554,017
6 Claims. (Cl. 336—96)

ABSTRACT OF THE DISCLOSURE

A method of and structure for unitizing a solenoid coil by injecting a predetermined quantity of hardening resin into the coil from the interior surface from a single passageway and distributing the resin injected throughout the coil until it appears at the outer surface thereof and thereafter hardening the resin.

---

This invention relates to an improved method of constructing a wire wound electrical coil, and more particularly to an improved method of providing an impregnant within a solenoid type coil structure to thereby form a rigid unitary assembly of all of the components of the structure.

A solenoid type coil construction conventionally comprises a suitable insulating spool, a wound coil thereon, a magnetic core, and pole pieces or end retaining members. In a coil construction of this type, which is primarily for vibratory or rotary operating devices, a problem exists in that during operation of a given device torsional forces of varying degrees develop between the various members of the assembly which eventually wears the insulating coating from the wire windings and/or breaks the end leads extending from the wound coil. This obviously results in failure of the device.

It has been known that a coil assembly that has been impregnated with a suitable thermosetting material such as impregnating varnish or the like will provide a rigidly bonded unitary structure which will resist torsional forces and thus extend the operating life of the device. Heretofore bonding of such coil assemblies has been accomplished by a method well known as vacuum impregnation. Although this method provides a satisfactory construction, it is not desirable where large production manufacturing is involved because it requires more elaborate equipment, more handling, and additional time, thus resulting in considerably higher manufacturing costs.

According to the present invention, it has been found that the use of additional insulating members incorporated in a coil assembly, and a simplified method of impregnating the assembly from the interior thereof, without the use of the usual vacuum equipment, is considerably less expensive overall than the method used heretofore to construct a similar coil. In addition it has been found that a solenoid type coil constructed according to the present invention will produce an improved unitary structure which will have the required mechanical strength to resist the injurious torsional forces described hereinabove.

It is therefore a principal object of this invention to provide an improved solenoid type coil construction.

It is another object of this invention to provide a simplified method to impregnate a solenoid type coil assembly with a suitable thermosetting bonding agent.

It is another object of this invention to provide a simplified method of impregnating a coil assembly which will insure a rigid bond between the various components of the assembly.

It is still another object of this invention to provide a simplified method to impregnate a coil assembly which is more economical than methods used heretofore.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Although the invention as stated hereinbefore is applicable to any solenoid type coil assembly, it is shown in the accompanying sectional drawing in the construction of a rotatable device such as a rotor of an alternator or the like. However, it should be remembered that the drawing is for illustration purposes only and that the invention is not to be limited thereto.

In the drawing a rotor assembly 10 is shown comprising a solenoid winding assembly 12. a magnetic core and pole assembly 20, and felt insulating members 30.

The solenoid winding assembly 12 is generally conventional in that it consists of an insulating winding tube 14 having a plurality of layers of wire wound thereon to form a coil 16. A difference in this assembly is that the tube 14 is provided with a plurality of perforations 14a the purpose for which will be apparent hereinafter.

The core and pole assembly 20 of magnetic material consists of a tubular core portion 22 defined by an annular closed wall having an aperture 22a therethrough, and pole portions 24 and 26. The aperture 22a is provided so that the assembled unit can be positioned on a shaft S (shown in phantom) to be rotated thereby. The pole portion 24 is shown as being integral with one end of the tubular core 22 while the pole portion 26 is suitably attached to the opposite end of the core with a plurality of threaded bolts 28, only one of which is shown. The manner in which the pole portion or end plate 26 is assembled to the tubular core 22 is conventional and facilitates assembly of the coil assembly 12 and the insulating members 30 onto the core 22. When in assembled form the core and pole portions provide a frame for a magnetic flux path of this type of construction, a characteristic well known to those experienced in the art.

In a structure of this type, the primary concern is the prevention of torsional movement within the windings of the coil 16, and between the mass of the coil 16 and the mass of the core and pole assembly 20. This is accomplished, partially, by impregnating the assembled unit with a suitable thermosetting epoxy resin 32 which cures by a chemical reaction and does not materially shrink in volume during the curing step. This will provide a satisfactory rigid bond between the windings of the coil 16 to withstand injurious forces that develop within the wound mass. To insure a rigid bond between the mass 16 and the mass 20, it has been found that additional means are necessary which can become saturated with the impregnating liquid. This is accomplished with the use of compressible felt members 30, one on each side of the coil assembly 12 and adjacent the interfaces of the poles 24 and 26. When these members are saturated with the impregnating liquid and allowed to harden they provide a considerable increase in adhesion between the adjacent surfaces of the masses 24, 16 and 26 to withstand the torsional forces which develop between the masses during rotation of the device that tend to separate the masses and eventually cause failure of the device. Moreover, the use of the felt members, which may be formed of any organic or inorganic electrical insulating material, provides additional electrical insulation between the coil 16 and the poles 24 and 26.

It should be mentioned that during tests of similar structures, it was found that the members 30 when in a felt-like form provided superior results over similar members having a woven construction.

An important feature of the invention is the method of directing the impregnating liquid into the assembly 10 to provide a unitary structure. As stated hereinabove, vacuum impregnation has been the most widely accepted method used heretofore when substantially 100% impregnation of a structure of this type was desired. In the instant invention it has been found that by providing suitable passages through portions of the interior of the structure impregnating liquid can be injected therein and accomplish the same substantially 100% impregnation without the use of vacuum.

Referring to the drawing the bolt 28 is positioned in a threaded cavity 28a provided in one end of the core 22. A similar threaded cavity is shown at 28b except that a hole 29 slightly smaller in diameter is counterbored from the inner end of the cavity 28b toward the center of the core 22 and parallel with the central aperture 22a. The bore 29 connects with a transverse bore 31 which pierces the wall of the core 22, to provide communication with the interior portion of the coil 12. For the purpose of simplicity, the connecting bores 28b, 29 and 31 will be referred to as a passageway 33. The inner end of the passageway 33 is so located in core 22 that it is in communication with a circumferential groove 34 formed in the outer annular surface of the core 22. It will be apparent from the drawing that when a bolt 28 is removed from its threaded relation in cavity 28b, communication is provided from the outer planar surface of the pole 26 to the perforated insulating tube 14 on the interior of the coil 12 as already described, such communication extending completely around the core 22, by the annular groove 34.

In order that an impregnant from a suitable source of supply (not shown) can be injected into the solenoid coil assembly, it is necessary to provide a means of connecting a simple injector or adapter to the device. In the drawing this is shown as a portion of a threaded tube 36 which may be hand tightened in the cavity 28b. The invention is not to be limited to the connecting means shown as the injecting pressure required is relatively low (less than 25 p.s.i.) and any threaded or unthreaded injector or adapter means may be used.

When the impregnant is injected under pressure into the coil assembly it is forced through the passageway 33, into and around the groove 34, through the perforations of the tube 14, and into the interstices between the windings of the coil 16. Substantially, simultaneously, the impregnant saturates the felt insulating members 30 at either side of the coil and eventually collects on the outer annular surface of the coil to provide a uniform insulating coating thereon, as shown at 32. After impregnation the assembly is heated in a conventional heating process to cure and harden the impregnant to provide a solid rigid bond between the parts to form a unitary structure.

There are several advantages in using this method to impregnate a structure of this type. For example, the viscosity of the impregnant is not important, and a relatively thick liquid can be used. This means that an injection process can be carried out at room temperature since neither the structure or the impregnant requires heating prior to the injection process. Also the fact that a uniform volume of the impregnant emerges to and completely covers the annular outer surface of the coil, allows the amount of impregnating material used for a given size solenoid to be metered with uniform results, thus saving time in a production line wherein a large number of units must be impregnated. Since the impregnant emerges uniformly from the outer surface of the coil rather than overflow in certain areas, additional time is saved, in that cleaning of the assembly is not necessary. The fact that there is no overflow to be removed also means a saving of impregnating liquid.

It should be remembered that the invention is concerned with internal impregnating of a completely assembled solenoid structure and not just a coil winding which is to be later assembled with a core, pole pieces, or the like.

It is to be understood that the above detailed description of the present invention is intended to disclose an embodiment thereof to those skilled in the art, but that the invention is not to be construed as limited in its application to the details of construction and arrangement of parts illustrated in the accompanying drawing since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. The method of unitizing a solenoid coil to its magnetic structure which embraces the coil on all sides except on at least one free side, comprising injecting a predetermined quantity of liquid hardening resinous material at low pressures into the coil adjacent the inner side away from the free side by a single passageway, distributing the liquid material to all parts of the coil until the impregnating material appears at the free surface, and treating the impregnated assembly to harden the resinous material.

2. In a solenoid type coil structure having a magnetic structure which embraces the coil on all sides except on at least one free side, an insulating tube positioned on an inner portion of said structure, a coil wound on said insulating tube, and a thermosetting bonding agent impregnating such structure, the improvement comprising spaced felt-like insulating members insulating said coil from the embracing portions of said structure, annular passage means positioned in the inner portion of said structure to provide communication to the central interior portion of said insulated tube, a second passage means extending to the exterior surface of the structure communicating with the annular passage means, and a body of thermosetting agent in a predetermined quantity introduced through said passage means impregnating said coil and said felt-like members to form a unitary structure.

3. In a solenoid type coil structure according to claim 2 wherein said magnetic frame includes a tubular core portion having an aperture therethrough to define an annular closed wall, and a portion of said passage means provided within said wall.

4. In a solenoid type coil structure according to claim 3 wherein a portion of said passage opens inwardly from one outer end of said tubular core parallel with said aperture to a passage transverse thereto terminating at the outer annular surface of the core.

5. In a solenoid type coil structure according to claim 4 wherein said tubular core is provided with an outer annular groove formed therein substantially centrally located with relation to the linear configuration of the tubular core and in connecting relation with said transverse portion of said passage.

6. In a solenoid type coil structure according to claim 2, wherein said insulating tube is formed of a perforated member to thereby provide additional passages in connecting relation with said annular groove, thus providing a through passage to the interior of the structure.

References Cited

UNITED STATES PATENTS

| | | | |
|---|---|---|---|
| 2,185,831 | 1/1940 | Camilli | 336—96 |
| 2,442,587 | 6/1948 | Coggeshall et al. | 336—96 X |
| 2,909,713 | 10/1959 | Hambor et al. | 336—205 |

DARRELL L. CLAY, *Primary Examiner.*

L. H. MYERS, *Examiner.*

T. J. KOZMA, *Assistant Examiner.*